US011303591B2

(12) United States Patent
Sumter et al.

(10) Patent No.: US 11,303,591 B2
(45) Date of Patent: *Apr. 12, 2022

(54) MANAGEMENT SYSTEM FOR AUDIO AND VISUAL CONTENT

(71) Applicant: Google LLC, Mountain View, CA (US)

(72) Inventors: George Cody Sumter, Palo Alto, CA (US); Christopher James Kelley, Palo Alto, CA (US); Matthew David Tait, London (GB); Alok Chandel, Sunnyvale, CA (US); Shane Riley Brennan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/253,586

(22) Filed: Jan. 22, 2019

(65) Prior Publication Data
US 2019/0158442 A1 May 23, 2019

Related U.S. Application Data

(63) Continuation of application No. 15/267,286, filed on Sep. 16, 2016, now Pat. No. 10,225,218.

(51) Int. Cl.
*H04L 12/58* (2006.01)
*G06F 9/54* (2006.01)
(Continued)

(52) U.S. Cl.
CPC .............. *H04L 51/10* (2013.01); *G06F 3/013* (2013.01); *G06F 3/167* (2013.01); *G06F 9/451* (2018.02); *G06F 9/542* (2013.01); *H04L 51/24* (2013.01)

(58) Field of Classification Search
CPC .......... G06F 3/167; G06F 15/16; G06F 9/451; G06F 3/013; G06F 9/542; G06F 3/165;
(Continued)

(56) References Cited

U.S. PATENT DOCUMENTS 10,133,546 B2 * 11/2018 Hart ........................ G06F 3/167
2002/0087555 A1   7/2002 Murata
(Continued)

FOREIGN PATENT DOCUMENTS

CN          105264485 A      1/2016
CN          105721920 A      6/2016
(Continued)

OTHER PUBLICATIONS

Second Office Action including Search Report for Chinese Patent Application No. 201780054039.3, dated Nov. 19, 2019, pp. 1-8.
(Continued)

*Primary Examiner* — Cao H Nguyen
(74) *Attorney, Agent, or Firm* — Lerner, David, Littenberg, Krumholz & Mentlik, LLP

(57) ABSTRACT

Systems, apparatuses, and methods for managing message content are provided. In one embodiment, a method includes receiving, by one or more computing devices, a message comprising audio content and visual media content. The method further includes sending, by the one or more computing devices, a first set of data descriptive of the audio content to an audio device. The audio device is configured to communicate the audio content to a user of the audio device. The method includes sending, by the one or more computing devices, a second set of data descriptive of the visual media content to a display device. The display device is configured to display the visual media content for the user. The method further includes providing, by the one or more computing devices, a notification to the user of the audio device to view the visual media content on the display device.

18 Claims, 6 Drawing Sheets

(51) Int. Cl.
*G06F 9/451* (2018.01)
*G06F 3/01* (2006.01)
*G06F 3/16* (2006.01)
*H04L 51/10* (2022.01)
*H04L 51/224* (2022.01)

(58) Field of Classification Search
CPC .......... H04W 4/80; H04L 12/58; H04L 51/10; H04L 51/24
See application file for complete search history.

(56) References Cited

U.S. PATENT DOCUMENTS

| | | | | |
|---|---|---|---|---|
| 2013/0136089 | A1* | 5/2013 | Gillett | H04W 72/048 370/329 |
| 2014/0006496 | A1* | 1/2014 | Dearman | H04L 67/303 709/204 |
| 2015/0350129 | A1* | 12/2015 | Cary | H04W 4/90 709/206 |

FOREIGN PATENT DOCUMENTS

| | | |
|---|---|---|
| JP | 2002202786 A | 7/2002 |
| JP | 2002335502 A | 11/2002 |
| JP | 2006012056 A | 1/2006 |
| JP | 2007173920 A | 7/2007 |
| JP | 2008048036 A | 2/2008 |
| JP | 2011022817 A | 2/2011 |
| JP | 2014027360 A | 2/2014 |
| JP | 2016519805 A | 7/2016 |
| JP | 2017523622 A | 8/2017 |
| KR | 20130004588 A | 1/2013 |
| WO | 2011109344 A1 | 9/2011 |

OTHER PUBLICATIONS

First Office Action for Chinese Patent Application No. 201780054039.3 dated Aug. 12, 2019.
Written Opinion of the International Preliminary Examining Authority for PCT/US20 17/048595 dated May 15, 2018, 5 pages.
International Search Report for PCT/US2017/048595 dated Oct. 27, 2017, 10 pages.
Third Office Action for Chinese Patent Application No. 201780054039.3 dated Mar. 16, 2020. 7 pages.
Decision of Rejection for Chinese Patent Application No. 201780054039.3 dated May 25, 2020. 7 pages.
Office Action for European Patent Application No. 17764718.7 dated Jun. 15, 2020. 5 pages.
Office Action for Korean Patent Application No. 10-2021-7008786 dated Apr. 21, 2021. 3 pages.
Notice of Allowance for Korean Patent Application No. 10-2019-7009211 dated Dec. 24, 2020. 3 pages.
Office Action for Japanese Patent Application No. 2020-116243 dated Jun. 1, 2021. 5 pages.
Summons to Attend Oral Proceedings for European Patent Application No. 17764718.7 dated Oct. 5, 2021. 7 pages.

* cited by examiner

MANAGEMENT SYSTEM FOR AUDIO AND VISUAL CONTENT

CROSS-REFERENCE TO RELATED APPLICATIONS

The present application is a continuation of U.S. patent application Ser. No. 15/267,286 filed Sep. 16, 2016, the disclosure of which is hereby incorporated herein by reference.

FIELD

The present disclosure relates generally to managing message content, and more particularly to systems, apparatuses, and methods for managing audio and visual message content within a device ecosystem.

BACKGROUND

Individuals often carry several personal electronic devices at one time. This can include a mobile phone, a tablet, a laptop, etc. When a message (e.g., email) is sent to an individual, the message may be received by each of the individual's devices. The message may include a textual portion and an image portion. Each device may notify the user of the message receipt via an audible sound and/or vibration. However, each notice may be delivered to the user at a different time due to differences in refresh rate, processing, etc. Moreover, at the time of receipt, each device may not be appropriate for viewing the email message and image. For example, the user may be walking on a sidewalk, unable to view her laptop. Even if one of the devices reads the message aloud to the user, including a description of the image, she may not be able to fully comprehend the message's content. This can create a fractured user experience with the multitude of devices, as well as prevent receipt of certain message content by the user.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of managing message content. The method includes receiving, by one or more computing devices, a message including audio content and visual media content. The method includes sending, by the one or more computing devices, a first set of data descriptive of the audio content to an audio device. The audio device is configured to communicate the audio content to a user of the audio device. The method includes sending, by the one or more computing devices, a second set of data descriptive of the visual media content to a display device. The display device is configured to display the visual media content for the user. The method includes providing, by the one or more computing devices, a notification to the user of the audio device to view the visual media content on the display device.

Another example aspect of the present disclosure is directed to a computing system for managing message content. The system includes one or more processors and one or more tangible, non-transitory computer-readable media that stores instructions that, when executed by the one or more processors, cause the computing system to detect a plurality of user devices within a communication range. The instructions further cause the computing system to select at least a first user device of the plurality of user devices as an audio device and at least a second user device of the plurality of user devices as a display device. The instructions further cause the computing system to receive a message including audio content and visual media content. The instructions further cause the computing system to send a first set of data descriptive of the audio content to the first user device. The first user device is configured to communicate the audio content for a user of the first user device. The instructions further cause the computing system to send a second set of data descriptive of the visual media content to the second user device. The second user device is configured to display the visual media content for the user.

Yet another example aspect of the present disclosure is directed to one or more tangible, non-transitory computer-readable media storing computer-readable instructions that when executed by one or more processors cause the one or more processors to perform operations. The operations include detecting a plurality of user devices within a communication range. The operations further include determining one or more capabilities and a status of each user device in at least a subset of the plurality of user devices. The operations further include selecting at least one user device of the subset of user devices as an audio device and at least one user device of the subset of user devices as a display device based at least in part on the one or more capabilities and the status of the respective user devices. The operations further include receiving a message including audio content and visual media content. The operations further include sending a first set of data descriptive of the audio content to the audio device. The audio device is configured to communicate the audio content for a user of the audio device. The operations further include sending a second set of data descriptive of the visual media content to a display device. The display device is configured to display the visual media content for the user. The operations further include providing a notification to the user of the audio device to view the visual media content on the display device.

Other example aspects of the present disclosure are directed to systems, apparatuses, methods, tangible, non-transitory computer-readable media, memory devices, and electronic devices for managing message content.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
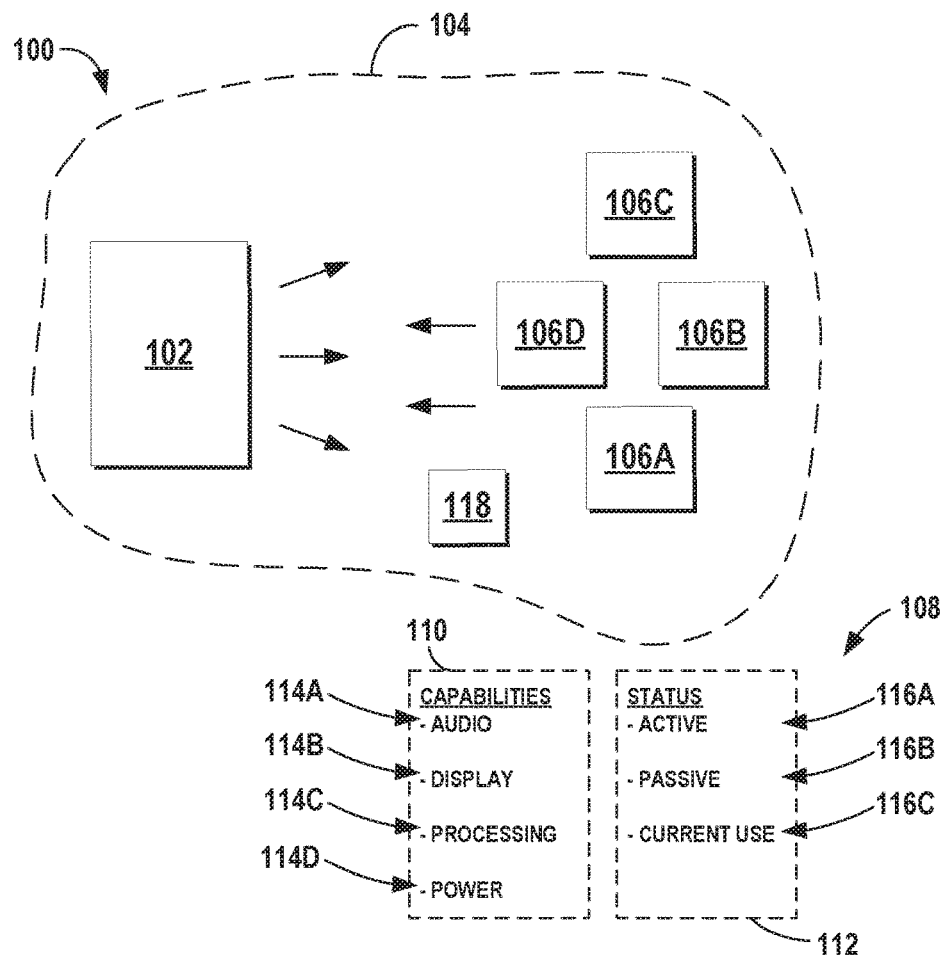
FIG. 1 depicts an example plurality of user devices according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to managing message content within a user device ecosystem. The ecosystem can include a plurality of user devices (e.g., wearable user devices), some of which can serve as a broker device, an audio device, and a display device. For instance, the broker device can be a user's mobile phone, which can detect the presence of other user device(s) that are being worn by a user such as a Bluetooth headset and a smart watch with a display. The broker device can select the Bluetooth headset for use as the audio device and the smart watch for use as the display device. The broker device can receive a message that includes audio content and visual media content and coordinate communication of such content to the user via the audio and display devices. For example, the mobile phone can receive a text message that includes text (e.g., audio content) as well as an image embedded therein (e.g., visual media content). If needed, the broker device can convert the text to a format that can be played for the user and can send it to the audio device (e.g., Bluetooth headset). The broker device can send the visual media content to the display device (e.g. smart watch). The Bluetooth headset can communicate the text of the message to the user, and when it gets to the portion of the message that includes the image, the Bluetooth headset can provide the user with a notification that there is visual media content (e.g., the image) that is viewable on the smart watch. The notification can include, for instance, a phrase such as "view your watch," a tone (e.g., "beep"), etc. The smart watch can then display the visual media content for the user to view. In this way, the system can coordinate communication of a message to a user by leveraging the various capabilities of the individual user devices within the ecosystem.

More particularly, an example system according to aspects of the present disclosure can include a plurality of user devices. The user devices can be included within a multi-device ecosystem. For example, as indicated above, the user devices can be wearable user devices such as a mobile phone, a Bluetooth headset, a computerized watch (e.g., a smart watch), computerized eyewear, computerized headwear, other types of wearable computing devices, etc. In another example, the user devices can be "non-wearable" user devices such as a desktop computer, an integrated device (e.g., Google Chromecast®), television, speaker system, etc. One or more of the user device(s) can function as one or more broker device(s), an audio device, and/or a display device for the ecosystem.

The broker device(s) can select which of the user devices in the ecosystem are to serve as the audio device and the display device. For instance, the broker device(s) can detect which user devices are within the ecosystem (e.g., are within a communication range of the broker device(s)). The broker device(s) can determine one or more capabilities and a status of each user device. The capabilities can include audio capability, display capability, processing capability, power capability, etc. The status of a user device can indicate whether the device is active (e.g., currently processing, downloading, uploading), whether the device is passive (e.g., sleep mode, locked-screen), and/or whether the user device is currently being used (e.g., the user is interacting with the device). The broker device can identify (e.g., rank) one or more of the user device(s) for potential use as the audio device and/or for potential use as the display device based, at least in part, on the device's capabilities and status.

By way of example, a user's mobile phone can function as a broker device that can select at least one user device as the audio device and at least one user device as the display device. The mobile phone can detect that a Bluetooth headset, computerized eyewear, and a smart watch with a display are within a communication range of the mobile phone. Both the Bluetooth headset and the smart watch may include speakers for audibly producing sound. Thus, the mobile phone may identify both the Bluetooth headset and the smart watch for potential use as the audio device. However, the Bluetooth headset may be preferred (e.g., ranked higher) than the smart watch for potential use as the audio device because the Bluetooth headset has better audio capabilities (e.g., higher quality speakers, more private audio delivery) than the smart watch. The smart watch and the computerized eyewear can be identified for potential use as the display device. However, the smart watch may be preferred (e.g., ranked higher) than the computerized eyewear for potential use as the display device because the smart watch may be active while the computerized eyewear may be passive (e.g., in the user's pocket). Accordingly, the mobile phone (e.g., the broker device) can select the Bluetooth headset for use as the audio device and the smart watch for use as the display device. Additionally and/or alternatively, as further described herein, the mobile phone itself can function as the audio device and/or the display device.

The broker device(s) can coordinate delivery of different types of content to the user via the audio device and the display device. For instance, the broker device(s) can receive a message comprising audio content and visual media content. The message can include a text message, an email message, a podcast, a seminar, an audio book, an audio illustrative book, a television program, streaming data, articles, documents, and/or any other types of information that would be listened to and/or read by the user. The message can include audio content and visual media content. The audio content can include data in an audio format (e.g., WAV, AIFF, AU, FLAC, MP3, other formats with lossless or lossy compression) that can be audibly produced and/or in a textual format (e.g., doc, pdf, txt, html, xml, other formats) that can be converted into a format that can be audibly produced. The visual media content can include image data, videos, emjois, stickers (e.g., bitmoji), maps, GIFs, MIMEs, textbook figures, graphical representations (e.g., heatmaps), diagrams, animations, illustrations, and/or other types of information that can be viewed by a user.

The broker device(s) can identify the audio content of the message and the visual media content of the message and respectively distribute them to the audio and display devices. For example, the mobile phone (e.g., broker device) can receive a text message. The text message can include textual data (e.g., "Look at my dog. Isn't he cute?") and image data (e.g., an image of a dog). The mobile phone can identify the textual data as the audio content, convert it to an audio format (if needed), and send it to the Bluetooth headset (e.g., audio device), which can be configured to communicate the text to a user. Moreover, the mobile phone can identify the image as the visual media content and send it to the smart watch (e.g., display device) which can be configured to display the image of the dog for the user.

The broker device(s) can provide a notification to the user such that the user can view the visual media content at an appropriate time while listening to the audio content. The notification can be a term, phrase, earcon, tone, noise, vibration, etc. that can indicate to the user that the user can view the visual media content on the display device. In some implementations, the broker device(s) can send data descriptive of a notification to the audio device, which can communicate the notification for the user of the audio device. The notification can be indicative of an action (e.g., the phrase "look at your watch"), the type of content (e.g., "to view a photo/video/emjoi"), and/or the actual content (e.g., "of a dog"). Additionally, and/or alternatively, the broker device(s) can send data descriptive of a notification to the display device, which can provide the notification (e.g., a vibration) to the user. In either implementation, the notification can be provided to the user at a time when the user would most likely view the visual media content if the user had read the text message. This can be, for example, before the audio content is communicated to the user, while the audio content is being communicated to the user (e.g., via the Bluetooth headset) and/or after the audio content is communicated to the user. In some implementations, the display device can display the visual media content in response to an intent-to-view action (e.g., glance gesture) by the user and/or for a set time period (e.g., for 30 s after the notification is provided).

In some implementations, the broker device(s) can select a different device for use as the audio device and/or the display device while content is being delivered to the user. For instance, the broker device(s) can determine a change in status associated with at least one user device and select a different user device as the audio and/or display device. By way of example, while the audio content (e.g., text of message) is being provided to the user via the Bluetooth headset, the user may remove her computerized eyewear from her pocket and begin to use the eyewear (e.g., on her face). The mobile phone (e.g., broker device) can detect that the status of the computerized eyewear has changed (e.g., from passive to currently being used). As such, the mobile phone can select the computerized eyewear as the display device and send the data descriptive of the visual media content (e.g., the image of the dog) to the computerized eyewear, which can display the visual media content for the user.

The systems and methods of the present disclosure provide an improvement to user device computing technology. For instance, the systems and methods can more effectively coordinate the delivery of message content by sending a first set of data descriptive of the audio content to an audio device (to be communicated to the user), sending a second set of data descriptive of the visual media content to a display device (to be displayed for a user), and providing a notification to the user to view the visual media content on the display device. By selectively providing different types of content (e.g., audio, visual media) to certain user devices based, at least in part, on device capability and status, the systems and methods can ensure that the user is most effectively presented with the message content. Moreover, the systems and methods can preserve processing resources and power supply of user devices by sending only the necessary content to be presented by that device (rather than the entire message to each device). Furthermore, the systems and methods described herein can synchronize the user devices within a multi-device ecosystem to capitalize on the most appropriate functions of each device, allowing the user to experience the user devices in their highest fidelity. This allows the systems to manage device usage, as well as to eliminate repetitive, unsynchronized content delivery that can cause a fractured user experience.

Coordinating the delivery of different types of content to a user according to example aspects of the present disclosure can enable a multi-device ecosystem to effectively leverage the various capabilities of the devices in the ecosystem. Moreover, by providing the user with a notification as to when to view visual media content, the user can remain focused on other tasks (e.g., walking) and choose whether or not to view such content. As such, the systems and methods can capitalize on the capabilities of user devices to allow a user to more effectively multi-task, while still receiving messages.

With reference now to the FIGS., example embodiments of the present disclosure will be discussed in further detail. FIG. 1 depicts an example plurality of user devices 100 according to example embodiments of the present disclosure. The plurality of user devices 100 can be included in and/or make up a multi-device ecosystem. The plurality of user devices 100 can include any suitable type of a mobile computing device, a device associated with a user, a phone, a smart phone, a computerized watch (e.g., a smart watch), computerized eyewear, computerized headwear, other types of wearable computing devices, a tablet, a personal digital assistant (PDA), a laptop computer, a desktop computer, integrated device, audio system, television, a gaming system, a media player, an e-book reader, a television platform, a navigation system, a digital camera, an appliance, an embedded computing device, a sound system, or any other type of mobile and/or non-mobile computing device that is configured to perform the operations as described herein. In some implementations, the plurality of user devices 100 can include one or more wearable computing device(s) (e.g., a mobile phone, a Bluetooth headset, a smart watch, computerized eyewear, computerized headwear). In some implementations, the plurality of user devices 100 can be "non-wearable" user devices such as a desktop computer, an integrated device (e.g., Google Chromecast®), television, speaker system, etc.

One or more computing device(s) can be configured to function as one or more broker device(s) 102. The broker device(s) 102 can include, for example, a software application to perform the functions described herein for managing message content. For example, the broker device(s) 102 (e.g., the one or more computing device(s)) can be configured to detect the plurality of user devices 100 within a communication range 104. The communication range 104 can be, for example, a range in which the broker device(s) 102 can, at least, send data to one or more other user device(s) 106A-D. In some implementations, the communication range 104 can be a range in which the broker device(s) 102 and the user device(s) 106A-D can send and/or receive data from one another. In some implementations, the broker device(s) 102 and the user device(s) 106A-D can be associated with a user and/or can be given permission/authority to receive and/or transmit messages of the user. In some implementations, the broker device(s) 102 can be implemented on a server-side system.

The broker device(s) 102 can be configured to search for and identify the user device(s) 106A-D. For example, the broker device(s) 102 can send one or more first signal(s) (e.g., via Bluetooth protocol, UWB, RF) to determine whether any user device(s) 106A-D are within the communication range 104. The first signal(s) can be encoded to request and/or induce a response signal from the receiving device(s). For instance, one or more user device(s) 106A-D can receive the first signal(s) and send one or more second signal(s) to the broker device(s) 102, indicating that the user device 106A-D is within the communication range 104 and/or that the user device 106A-D can receive data from the broker device(s) 102. The second signal(s) can also, and/or alternatively, indicate the respective user device 106A-D (e.g., that sent the second signal). The broker device(s) 102 can be configured to identify one or more user device(s) 106A-D (e.g., within the communication range 104) based, at least in part, on the second signal(s).

The above described approach for identification of the user device(s) 106A-D by the broker device(s) 102 is not intended to be limiting. One of ordinary skill in the art would understand that various techniques and/or methods can be used for the broker device(s) 102 to determine whether and/or what user device(s) 106A-D are within the communication range 104 and/or can receive data from the broker device(s) 102. For example, in some implementations, the user device(s) 106A-D can provide signals to the broker device(s) 102 (e.g., indicating and/or identifying user device(s) 106A-D within the communication range 104) without receiving the first signals from the broker device(s) 102.

The broker device(s) 102 can be configured to determine one or more parameter(s) 108 associated with the user device(s) 106A-D. For example, the broker device(s) 102 can be configured to determine one or more capabilities 110 and/or a status 112 of each user device in at least a subset of the plurality of user devices 100. The one or more capabilities 110 can include an audio capability 114A, a display capability 114B, a processing capability 114C, a power capability 114D, and/or other capabilities of the respective user device 106A-D. The audio capability 114A of a user device 106A-D can be indicative of, for example, the type, quality, clarity, quantity, volume level, privacy level (e.g., headphone, speaker), etc. of the audio hardware (and/or associated software) of the respective user device 106A-D. The display capability 114B of a user device 106A-D can be indicative of, for example, the type, quality, clarity, resolution, sharpness, quantity, privacy level (e.g., screen size, ability to conceal from others), etc. of the display hardware (and/or associated software) of the respective user device 106A-D. The status 112 of a user device 106A-D can indicate the current operation state of the user device. For example, the status 112 can indicate whether the respective user device 106A-D is in an active status 116A (e.g., currently processing, downloading, uploading), whether the respective user device 106A-D is in a passive status 116B (e.g., sleep mode, locked-screen), and/or whether the user device is in a current use status 116C (e.g., the user is interacting with the device). Additionally, and/or alternatively, the status 112 can indicate whether the user device is turned on or off. The broker device(s) 102 can be configured to monitor (e.g., continuously, periodically, as-scheduled) the capabilities 110 and/or the status 112 of each of the user devices, for example, to determine a change in the capabilities 110 and/or status 112 associated with a user device.

The broker device(s) 102 can be configured to identify one or more of the user device(s) for potential use as an audio device and/or for potential use as a display device. In some implementations, the broker device(s) 102 can be configured to identify one or more user device(s) 106A-D for potential use as the audio device and/or the display device based, at least in part, on the parameters 108 associated with the user device(s) 106A-D. This can include an evaluation of the capabilities 110 and/or status 112 of the user device(s) 106A-D.

The broker device(s) 102 can be configured to identify one or more user device(s) for potential use as the audio device based, at least in part, on the one or more capabilities 110 and the status 112 of each of the respective one or more user device(s). By way of example, the plurality of user device(s) 100 can include a user's mobile phone, which can function as a broker device 102. The mobile phone can detect that a plurality of user devices are within the communication range 104. At least a subset of the user devices can include a first user device 106A (e.g., a Bluetooth headset), a second user device 106B (e.g., a smart watch), a third user device 106C (e.g., computerized eyewear), and a fourth user device 106D (e.g., a tablet). The broker device 102 (e.g., the mobile phone) can identify that the first user device 106A (e.g., Bluetooth headset), the second user device 106B (e.g., smart watch), and the fourth user device 106D (e.g., tablet) have audio output components (e.g., speakers, headphones) for audibly producing sound. Thus, the broker device 102 can identify the first, second, and fourth user devices 106A-B, D for potential use as the audio device.

Figure 2:
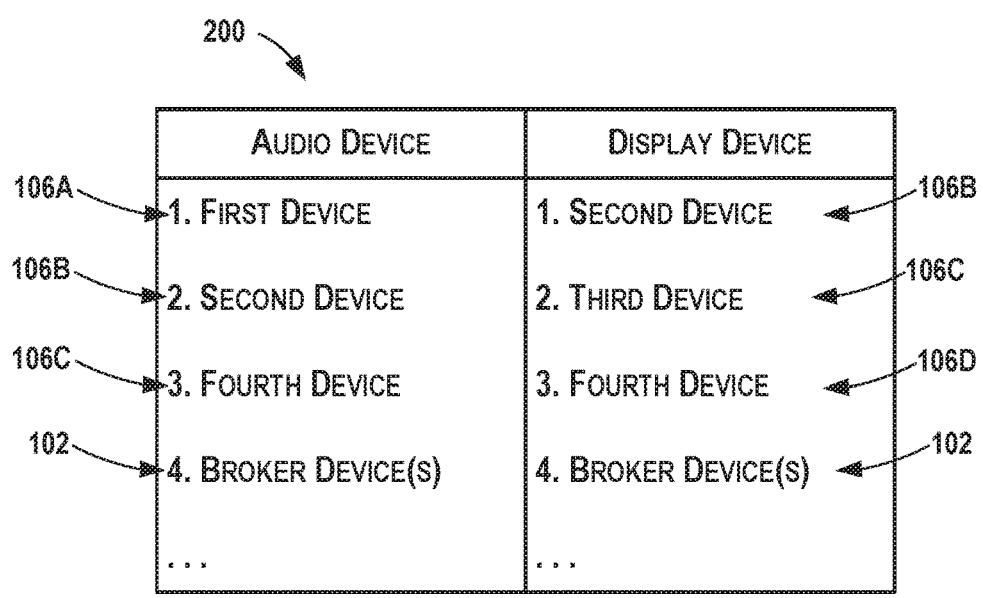
FIG. 2 depicts an example hierarchy of user devices according to example embodiments of the present disclosure.

As shown in FIG. 2, the broker device(s) 102 can rank these user devices for potential use as the audio device. Such ranking can be based, at least in part, on the one or more capabilities 110 and/or the status 112 of each of the respective user devices. For example, the first user device 106A (e.g., Bluetooth headset) may be preferred over (e.g., ranked higher than) the second user device 106B (e.g., smart watch) for potential use as the audio device because the first user device 106A may have better audio capabilities (e.g., higher quality speakers, more private audio delivery) than the second user device 106B. Additionally, and/or alternatively, the second user device 106B (e.g., smart watch) may be preferred over (e.g., ranked higher than) and the fourth user device 106D (e.g., tablet) because the second user device 106B may provide a more private delivery of audio content to the user (e.g., via smaller speakers) than the fourth user device 106D. Accordingly, the broker device(s) 102 can rank the first, second, and fourth user devices 106A-B, D in that order for potential use as the audio device.

The broker device(s) 102 can be configured to identify one or more user device(s) for potential use as the display device based, at least in part, on the one or more capabilities 110 and the status 112 of each of the respective one or more user device(s). For example, the broker device 102 (e.g., the mobile phone) can identify that the second user device 106B (e.g., smart watch), the third user device 106C (e.g., computerized eyewear), and the fourth user device 106D (e.g., tablet) have display output components (e.g., display screens) for making visual media content viewable for the user. Thus, the broker device(s) 102 can identify the second user device 106B, the third user device 106C, and the fourth user device 106D for potential use as the display device.

As shown in FIG. 2, the broker device(s) 102 can rank these user devices for potential use as the display device. Such ranking can be based, at least in part, on the one or more capabilities 110 and/or the status 112 of each of the respective user devices. For example, the second user device 106B (e.g., smart watch) may be preferred over (e.g., ranked higher than) the third user device 106C (e.g., computerized eyewear) for potential use as the display device because the second user device 106B may be in an active status 116A (e.g., processing) and/or a current use status 116C, while the third user device 106C may be in a passive status 116B (e.g., locked screen in the user's pocket). Additionally, and/or alternatively, the third user device 106C (e.g., computerized eyewear) may be preferred over (e.g., ranked higher than) and the fourth user device 106D (e.g., tablet) because the third user device 106C may have better visual capabilities (e.g., a more private, higher quality delivery of visual content to the user via the optical head mounted display) than the fourth user device 106D (e.g., tablet display screen). Accordingly, the broker device(s) 102 can rank the second, third, and fourth user devices 106B-D in that order for potential use as the display device.

In this way, the broker device(s) 102 can create one or more hierarchies 200 of user devices (as shown in FIG. 2) for potential use as the audio and/or display devices for communicating content to a user. The one or more hierarchies 200 can be based, at least in part, on the one or more capabilities 110 and/or status 112 of the respective user device(s) 106A-D, of at least a subset of the plurality of user devices 100. The hierarchies 200 can include a list, ranking, priority, order, etc. of the user devices organized based, at least in part, on the preference of those devices for each function. The broker device(s) 102 can store and/or access data descriptive of the one or more hierarchies 200 when selecting user device(s) for use as the audio and/or display device. As such, identification of a hierarchy of potential device usage in the manner described herein can help allow the systems and methods of the present disclosure to identify and allocate the message content to the most appropriate devices, save computational resources, and improve the user's experience with the user devices.

The above described approach for identification of the user device(s) 106A-D for potential use and creation of a hierarchy 200 is not intended to be limiting. One of ordinary skill in the art would understand that various techniques and/or methods can be used. For example, in some implementations, the broker device(s) 102 can create a hierarchy 200 by weighing the user device(s) 106A-D for their potential use as the audio and/or the display device. The weight afforded to each user device can be based, at least in part, on the one or more parameter(s) 108.

In some implementations, a user device can be identified for potential use as both the audio and the display device. For example, as shown in FIG. 2, one or more of the user devices (e.g., second user device 106B, fourth user device 106D) can be included in the hierarchy of user devices for potential use as the audio device and in the hierarchy of user devices for potential use as the display device. Such a scenario can arise when a particular user device has audio and visual capabilities that can allow it to serve as the audio and/or display device.

In some implementations, the broker device(s) 102 can be included in a hierarchy 200 of user devices. For instance, the broker device(s) 102 can identify one or more of the broker device(s) 102 for potential use as the audio device and/or the display device based, at least in part, on the capabilities and/or the status of the broker device(s) 102. By way of example, in the event that the user's mobile phone functions as a broker device 102, the mobile phone can be identified for potential use as an audio device due to its audio capabilities (e.g., speakers) and/or for potential use as an display device due to its visual capabilities (e.g., display screen). Moreover, the user's mobile phone may be in current use status 116C, thus making it the most preferred (e.g., highest ranked) user device for potential use as the display device. While FIG. 2 shows the broker device(s) 102 listed last in the one or more hierarchies 200, this is not intended to be limiting. In some implementations, the broker device(s) 102 can be ranked anywhere in the hierarchy 200 including, for instance, as the most preferred device for potential use as the audio device and/or the display device.

In some implementations, the broker device(s) 102 can be configured to adjust the one or more hierarchies 200 based, at least in part, on a change in the capabilities 110 and/or the status 112 of a user device 106A-D. As indicated above, the broker device(s) 102 can be configured to monitor (e.g., via one or more communication(s)) the capabilities 110 and/or the status 112 of one or more of the user device(s) of the plurality of user devices 100. The broker device(s) 102 can adjust a hierarchy 200 of user devices for potential use as the audio device based, at least in part, on the monitored capabilities and/or status. Additionally, and/or alternatively, the broker device(s) 102 can adjust a hierarchy 200 of user devices for potential use as the display device based, at least in part, on the monitored capabilities and/or status.

For instance, the broker device(s) 102 can adjust the one or more hierarchies 200 based, at least in part, on a change in the capabilities 110 of a user device 106A-D. By way of example, a user may drop the second user device 106B (e.g., smart watch) decreasing the audio capabilities 114A of the second user device 106B (e.g., damaging the speakers). The broker device(s) 102 can identify the change in capabilities 110 (e.g., via one or more communications with the second user device 106B) and can rank the second user device 106B lower in the hierarchy 200 for potential use as the audio device based, at least in part, on the decreased audio capabilities 114A (e.g., due to damaged speakers).

Additionally, and/or alternatively, the broker device(s) 102 can adjust the one or more hierarchies 200 based, at least in part, on a change in the status 112 of a user device 106A-D. For example, a user may remove the third user device 106C (e.g., computerized eyewear) from the user's pocket and begin to use the third user device 106C (e.g., on her face). The broker device(s) 102 can detect/identify the change in status 112 of the third user device 106C (e.g., from passive to currently being used). Accordingly, the broker device(s) 102 can adjust the hierarchy 200 such that the third user device 106C is higher in the hierarchy 200 for potential use as the display device based, at least in part, on the changed status 112 (e.g., from passive to current use status).

In some implementations, one or more new user device(s) can be added to the one or more hierarchies 200. For instance, returning to FIG. 1, the broker device(s) 102 can be configured to monitor (e.g., continuously, periodically, as-scheduled) for one or more new user device(s) 118 that are added to the plurality of user devices 100 (e.g., the device ecosystem). This can include devices that are within the communication range 104 and/or associated with the user. For example, a user can turn-on, begin to use, move within range of, etc. the new user device(s) 118 (e.g., a laptop). The broker device(s) 102 can be configured to detect that the new user device(s) 118 have been added to the plurality of user devices 100 (and/or is within the communication range 104) and can be configured to determine one or more capabilities 110 and/or a status 112 of the new user device(s) 118. Moreover, the broker device(s) 102 can identify the new user device(s) 118 for potential use as the audio device and/or the display device based, at least in part, on the one or more capabilities 110 and/or the status 112 of each of the respective new user device(s) 118. In some implementations, the broker device(s) 102 can add the new user device(s) 118 to the one or more hierarchies 200 for potential use as the audio device and/or display device.

Returning to FIG. 2, the broker device(s) 102 can be configured to select one or more user device(s) for use as the audio device and/or display device. The selection can be based, at least in part, on the parameters 108. The broker device(s) 102 can select at least one user device (e.g., 106A) of the subset of user devices (e.g., 106A-D) as an audio device and at least one user device (e.g., 106B) of the subset of user devices as a display device based, at least in part, on the one or more capabilities 110 and/or the status 112 of the respective user devices. Additionally and/or alternatively, the broker device(s) 102 can select user device(s) for use as the audio device and/or display device based, at least in part, on the one or more hierarchies 200. By way of example, the broker device(s) 102 can select at least a first user device (e.g., 106A) of the plurality of user devices 100 as an audio device and at least a second user device (e.g., 106B) of the plurality of user devices as a display device. The first user device 106A being the most preferred, first ranked, top priority, etc. device (e.g., in the hierarchy) for use as the audio device and the second user device 106B being the most preferred, first ranked, top priority, etc. (e.g., in the hierarchy) device for use as the display device (as shown in FIG. 2). If the most preferred, top ranked, etc. user device is not available for use as the audio and/or display device, the broker device(s) 102 can select the next user device in the hierarchy 200. In some implementations, this can continue until the broker device(s) 102 find one or more user device(s) that are available for use as the audio and/or display device. In some implementations, if needed, the broker device(s) 102 can select a user device that is in a passive status 116B (e.g., the visual media content being displayed over a locked screen).

Figure 3:
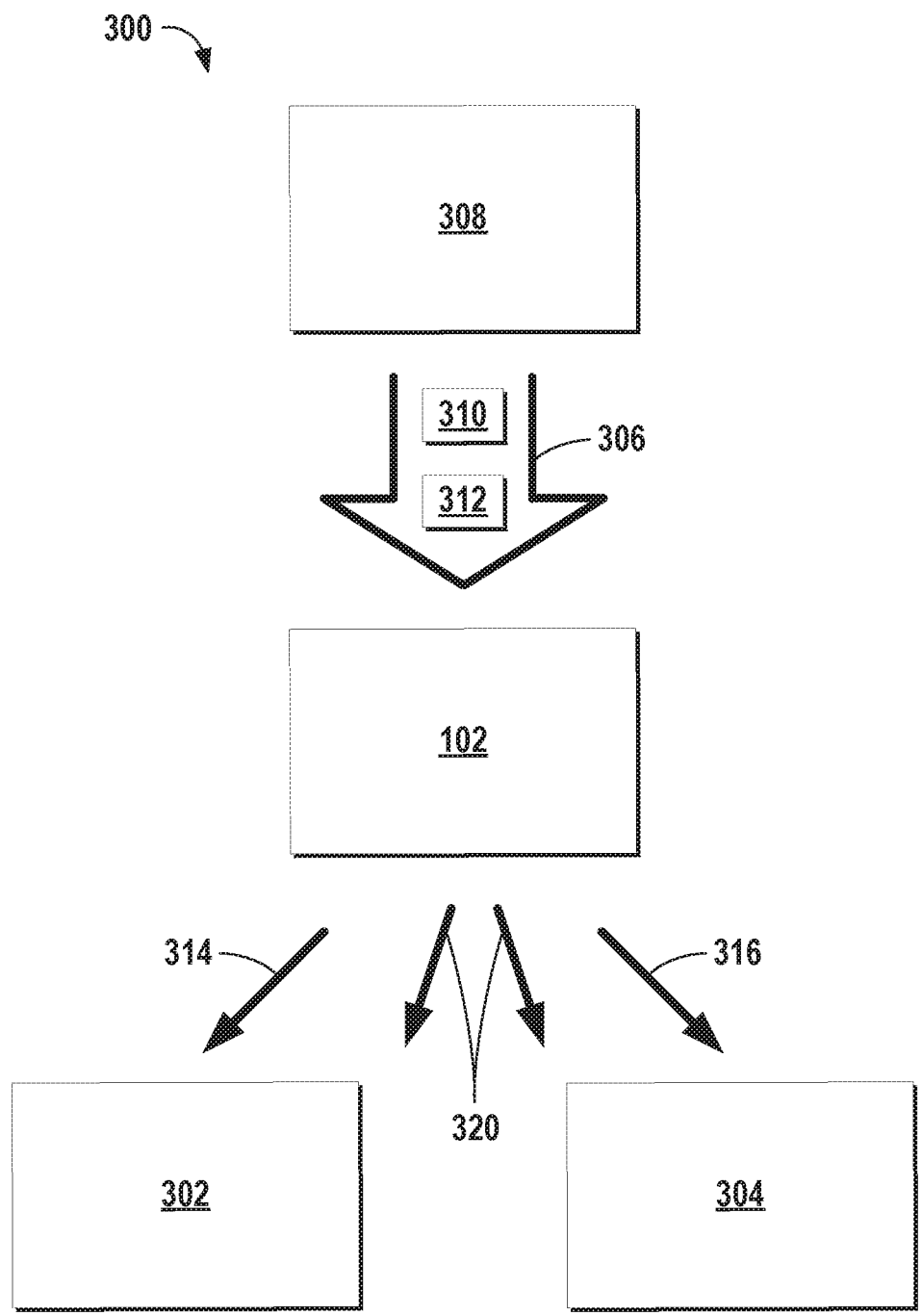
FIG. 3 depicts an example system according to example embodiments of the present disclosure.

FIG. 3 depicts an example system 300 according to example embodiments of the present disclosure. As shown, the system 300 can include the broker device(s) 102, an audio device 302, and a display device 304. As indicated above, at least a first user device (e.g., 106A) can be used as the audio device 302 and/or at least a second user device (e.g., 106B) can be used as the display device 304. The broker device(s) 102 can be configured to deliver different types of content to the user via the audio device 302 and the display device 304.

The broker device(s) 102 can be configured to receive a message 306. The message 306 can include data descriptive of a text message, an email message, a calendar message/invite/reminder, a podcast, a seminar, an audio book, audio illustrative book, television program, radio program, articles, documents, social media messages, streaming data, and/or any other types of information that may be read and/or listened to by a user. In some implementations, the broker device(s) 102 can receive the message 306 (e.g., a text message, email message) from another computing device 308 (e.g., another user's mobile phone, cloud based server). In some implementations, the broker device(s) 102 can receive, obtain, access, etc. the message 306 (e.g., a podcast) from one or more memory device(s) associated with or included in the broker device(s) 102. In some implementations, the broker device(s) 102 can receive the message from a software application running on the broker device(s) 102.

The message 306 can include different types of content. For example, the message 306 can include a first type of content, such as audio content 310, and a second type of content, such as visual media content 312. The audio content 310 can include data in an audio format (e.g., WAV, AIFF, AU, FLAC, MP3, other formats with lossless or lossy compression) that can be audibly produced and/or in another format, such as a textual format (e.g., doc, pdf, txt, html, xml, other formats), that can be converted into a format that can be audibly produced. The visual media content 312 can include image data, videos, emojis, stickers (e.g., bitmoji), maps, GIFs, MIMEs, textbook figures, graphical representations (e.g., heatmaps), diagrams, animations, illustrations, and/or other types of information that can be viewed by a user. In some implementations, content in a textual format (e.g., text with bold font, exclamation point) can also be displayed as visual media content to provide further contextual information for a user.

The broker device(s) 102 can be configured to identify the different types of content included in the message 306. For instance, in some implementations, the message 306 can be received by the broker device(s) 102 with a message notification that includes a plurality of fields. At least one field can include a first type of content (e.g., audio content 310) and at least one field can include a second type of content (e.g., visual media content 312). The broker device(s) 102 can split the different types of content into different states. For example, the broker device(s) 102 can split the audio content 310 from the visual media content 312. Additionally and/or alternatively, the message 306 can be provided to the broker device(s) 102 via an application programming interface (API), which can allow for the identification of the different types of content. In some implementations, audio content 310 and/or visual media content 312 can be identified for the broker device(s) 102 via the API.

The broker device(s) 102 can be configured to send different types of content to the user device(s). For example, the broker device(s) 102 can be configured to send a first set of data 314 descriptive of the first type of content (e.g., audio content 310) to the first user device 106A (e.g., functioning as the audio device 302). The first user device 106A can be configured to communicate the first type of content (e.g., audio content 310) for a user of the first user device 106A. The broker device(s) 102 be configured to send a second set of data 316 descriptive of the second type of content (e.g., visual media content 312) to the second user device 106B (e.g., functioning as the display device 304). The second user device 106B can be configured to display the second type of content (e.g., visual media content 312) for the user.

By way of example, the broker device(s) 102 (e.g., a mobile phone) can receive a text message. The text message can include textual data (e.g., "Look at my dog. Isn't he cute?") and image data (e.g., an image of a dog). The broker device(s) 102 can identify the textual data as the audio content 310, convert it to an audio format (if needed), and send data descriptive of the audio content 310 to the audio device 312 (e.g., a Bluetooth headset), which can be configured to communicate the text to a user. Moreover, the broker device(s) 102 (e.g., mobile phone) can identify the image as the visual media content 312 and send data descriptive of the visual media content 312 to the display device 304 (e.g., smart watch) which can be configured to display the image of the dog for the user.

The broker device(s) 102 can be configured to provide a notification to a user of the first user device 106A (functioning as the audio device 302) to view the visual media content 312 on the second user device 106B (functioning as the display device 304), at an appropriate time. The notification can be a term, phrase, earcon, tone, noise, vibration, etc. that can indicate to the user that the user can view the visual media content 312 on the display device 304. For instance, the broker device(s) 102 can be configured to send data 320 descriptive of the notification to the audio device 302 (e.g., the first user device 106A). The audio device 302 (e.g., the first user device 106A) can be configured to communicate the notification to the user of the audio device 302. Additionally and/or alternatively, the broker device(s) 102 can be configured to send data 320 descriptive of the notification to the display device 304 (e.g., the second user device 106B). The display device 304 (e.g., the second user device 106B) can be configured to provide the notification to the user.

Figure 4:
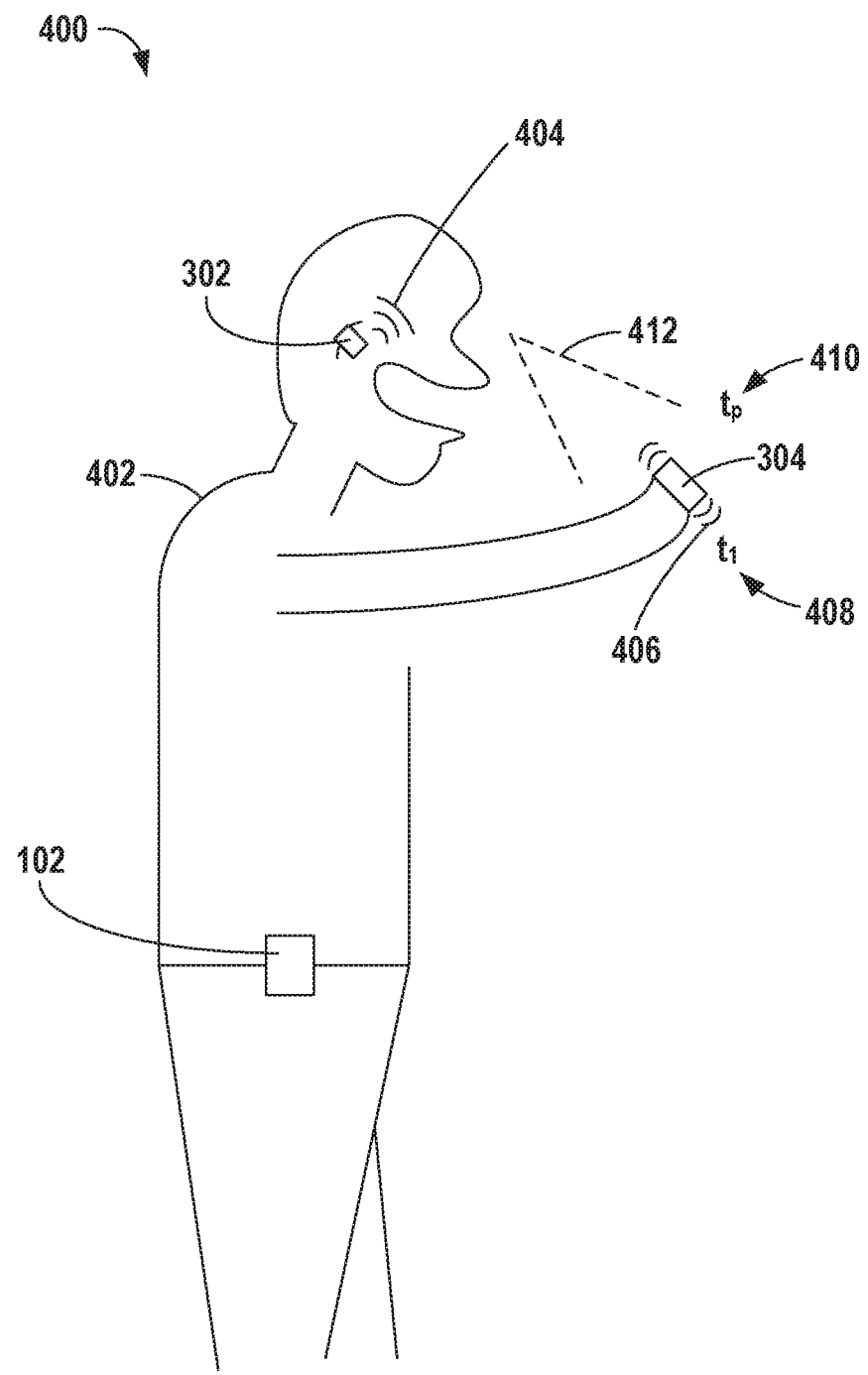
FIG. 4 depicts an example user-implementation of an example system according to example embodiments of the present disclosure.

FIG. 4 depicts an example user-implementation 400 of the example system 300 according to example embodiments of the present disclosure. As shown, the broker device(s) 102, the audio device 302, and/or the display device 304 can be a wearable device that can be worn or otherwise carried by the user 402. For example, the broker device(s) 102 can include the mobile phone of the user 402, the audio device 302 can include the first user device 106A (e.g., a Bluetooth headset), and the display device 304 can include the second user device 106B (e.g., a smart watch). As indicated above, the broker device(s) 102 can receive a message 306 (e.g., a text message) that includes audio content 310 (e.g., text) and visual media content 312 (e.g., an image). The broker device(s) 102 can send data descriptive of the audio content 310 (e.g., audio formatted text) to the audio device 302 (e.g., a Bluetooth headset) which can communicate the text of the message 306 to the user 402. The broker device(s) 102 can also send data descriptive of the visual media content 312 (e.g., the image) to the display device 304 (e.g., a smart watch) which can communicate the image of the message 306 to the user 402.

To allow the user 402 to view the visual media content 312 at the appropriate time, the broker device(s) 102 can provide a notification 404 to the user 402 via the audio device 302. The notification 404 can include, for example, a phrase such as "look at your watch", "Person X sent an image, you can view it on your watch," a tone, etc. Additionally, and/or alternatively, the broker device(s) 102 can provide a notification 406 to the user 402 via the display device 304. The notification 406 can include, for example, a vibration, a visual notification (e.g. flashing light), etc. In some implementations, the notification 406 can include a phrase, a tone, etc. The notification 404, 406 can be provided to the user 402 before the audio content 310 is communicated to the user 402, while the audio content 310 is being communicated to the user 402, and/or after the audio content 310 is communicated to the user 402. In this way, the notification can be provided to the user at a time when the user would most likely view the visual media content if the user had read the text message. This can help provide the user with an improved user experience with a plurality of user devices.

In some implementations, the notification(s) 404, 406 can increase in subtlety the more the user 402 uses and/or becomes familiar with the systems and methods. For example, the notification 404 can include a phrase (e.g., "look at your watch") when notifications are first provided to the user 402. Once a threshold number of notifications have been provided to the user 402, the subtlety of the notification 404 can increase. For example, once the threshold is reached, the notification 404 can include a tone (e.g., "beep"), instead of a phrase (e.g., "look at your watch"). The broker device(s) 102 and/or the user device(s) can be configured to determine and store (e.g., in associated memory device(s)) the number of notifications provided to the user 402, the threshold number of notifications, and/or whether the threshold number has been reached.

The display device 304 can be configured to display the visual media content 312 according to different time schemes. The display device 304 can be configured to display the visual media content 312 before the audio content 310 and/or notification 404, 406 is communicated to the user 402, while the audio content 310 and/or notification 404, 406 is being communicated to the user 402, and/or after the audio content 310 and/or notification 404, 406 is communicated to the user 402. For example, the notification 404, 406 can be provided to the user 402 of the audio device 302 at a first time 408, and the display device 304 can be configured to display the visual media content 312 for the user at the first time 408. In some implementations, the display device 304 can begin to display the visual media content 312 at a time (e.g., fixed time, default time, user-defined time, variable time depending on content) before or after the notification 404, 406 is provided to the user 402.

In some implementations, the display device 304 can display the visual media content 312 for a time period 410 ("tp"). The time period 410 can be a default time period and/or a time period set by the user 402 (e.g., via a user interface). In some implementations, the time period 410 can vary based, at least in part, on the type of visual media content 312 (e.g., video, image, emoji). For example, the display device 304 can be configured to display an image for 10 s, 20 s, 30 s, 1 minute, etc. starting at the time (e.g., at first time 408), before, or after the notification 404, 406 is provided to the user 402. In another example, the visual media content 312 can include a video. The display device 304 can begin to play the video concurrently when (or after) the notification 404, 406 is provided to the user 402. In some implementations, the user 402 can interact with the display device 304 to rewind, fast-forward, replay, pause, stop, close, etc. the video.

In some implementations, the display device 304 can be configured to communicate the visual media content 312 to the user 402 based, at least in part, on an action by the user 402. For instance, the display device 304 can be configured to display the visual media content 312 for the user 402 based, at least in part, on an intent-to-view action 412 by the user 402. The intent-to-view action 412 can be, for example, a glace gesture that is detectable by the display device 304. In some implementations, the display device 304 can be configured to display the visual media content 312 in response to the intent-to-view action 412. The displayed device 304 can be configured to display the visual media content 312 (e.g., an image) within an action window that starts upon detection of the intent-to-view action 412 (e.g., by the display device 304). In some implementations, the display device 304 can display the visual media content 312 and also include a timeframe in which the intent-to-view action 412 must occur for the visual media content 312 to continue to be displayed. In some implementations, the display device 304 can refrain from displaying the visual media content 312 for a user 402 until the user 402 conducts an intent-to-view action 412.

For certain types of visual media content, the display device 304 can be configured to display it for the user 402 without a notification 404, 406 being provided to the user 402. For example, the message 306 can include an email message that includes a textual portion within an emoji included in the text. As described herein, the audio device 302 can communicate the text portion to the user 402. The broker device(s) 102 can send data indicative of the emoji to the display device 304. The display device 304 can display the emjoi for the user 402, at a time when the emoji would appear in the text portion, without the broker device(s) 102 providing a notification to the user 402. For example, the display device 304 can display the emoji while the audio device 302 is communicating the sentence of the email text in which the emoji originally appeared, without a notification 404, 406 being provided to the user 402. In this way, the systems and methods can be configured to passively provide the user 402 with visual media content 312 that may be of lesser value for a user's contextual understanding of the message 306.

Figure 5:
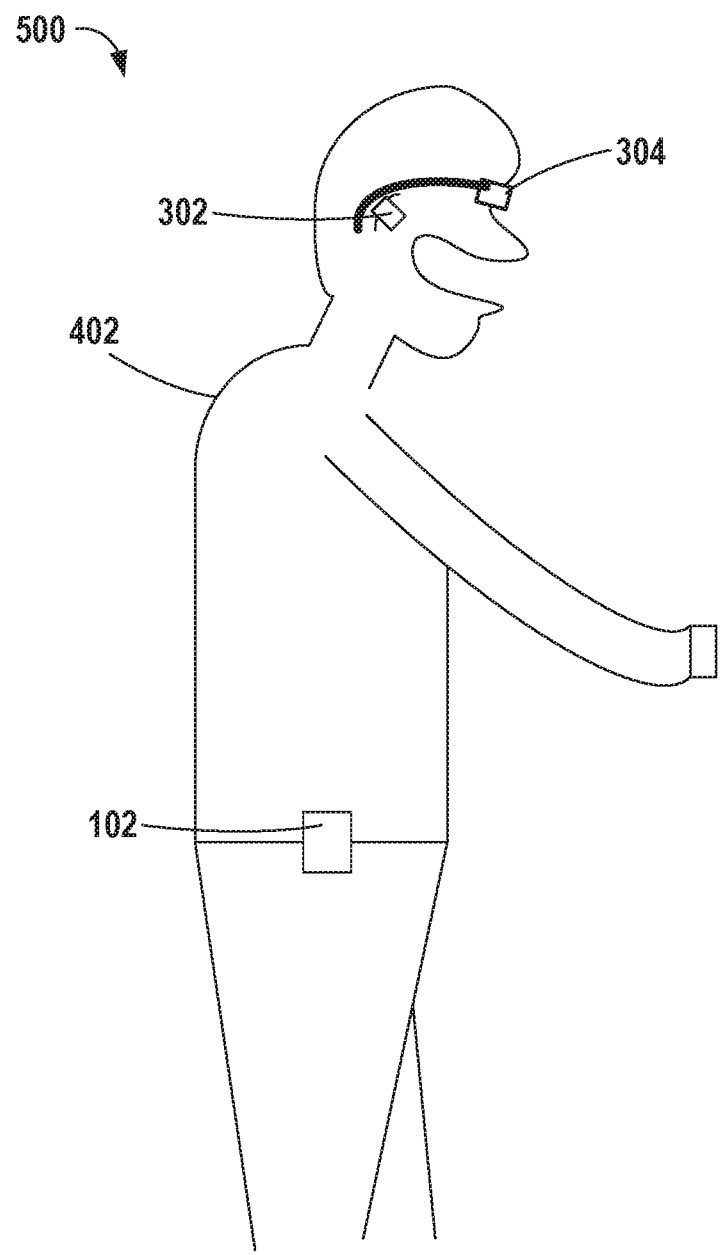
FIG. 5 depicts another example user-implementation of an example system according to example embodiments of the present disclosure.

The broker device(s) 102 can be configured to select a new device as the audio device 302 and/or the display device 304, even while audio content 310 and/or visual media content 312 is being communicated to the user 402. For instance, the broker device(s) 102 can be configured to determine a change in the status 112 associated with at least one user device of the plurality of user devices 100. The broker device(s) 102 can be configured to select a different user device (than originally selected) as the audio device 302 and/or the display device 304 based, at least in part, on the change in the status 112. By way of example, as shown in FIG. 5, while the audio content 310 (e.g., text of message) is being provided to the user 402 via the audio device 302 (e.g., headset), the user 402 may remove the third user device 106C (e.g., computerized eyewear) from the user's pocket and begin to use the device (e.g., on the user's face). The broker device(s) 102 can detect that the status 112 of the third user device 106C has changed (e.g., from a passive status to current use status). The broker device(s) 102 can be configured to select the third user device 106C (e.g., computerized eyewear) as the display device 304 and send the data descriptive of the visual media content 312 (e.g., the image) to the third user device 106C, which can display the visual media content 312 for the user 402. In some implementations, the broker device(s) 102 can detect the addition of a new user device (e.g., 118) and select the new user device for use as the audio device 302 and/or display device 304, even while content is being communicated to the user 402.

Figure 6:
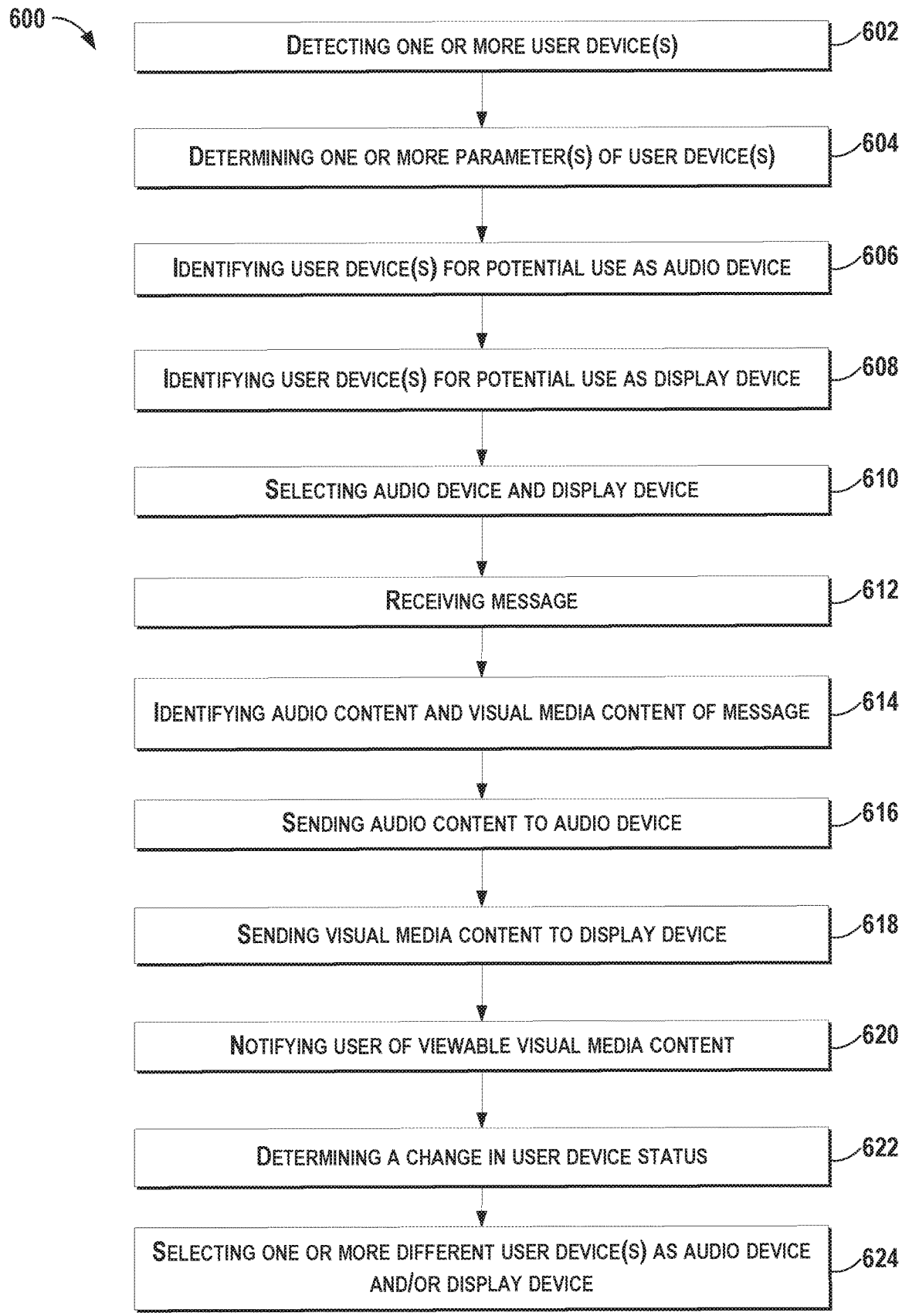
FIG. 6 depicts a flow diagram of an example method according to example embodiments of the present disclosure.

FIG. 6 depicts a flow chart of an example method 600 of managing message content according to example embodiments of the present disclosure. One or more portion(s) of method 600 can be implemented by a computing device such as, for example, the broker device(s) and/or the user devices shown in FIGS. 1 and 7. FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (602), the method 600 can include detecting one or more user device(s). For instance, one or more broker device(s) 102 (e.g., one or more computing device(s)) can detect a user device and/or a plurality of user devices 100 within a communication range 104 of the one or more broker device(s) 102. At (604), the method 600 can include determining one or more parameter(s) of the user device(s). For instance, the broker device(s) 102 can determine one or more capabilities 110 and a status 112 of each user device 106A-D in at least a subset of the plurality of user devices 100. As described herein, the one or more capabilities 110 can be, for example, indicative of at least one of an audio capability 114A and/or a display capability 114B. The status 112 (of a user device) can be, for example, indicative of at least one of an active status 116A, a passive status 116B, and a current user status 116C.

At (606), the method 600 can include identifying one or more user device(s) for potential use as an audio device. For instance, the broker device(s) 102 can identify one or more user device(s) (e.g., 106A-B, D) of at least the subset of user devices for potential use as the audio device 302 based, at least in part, on the one or more capabilities 110 and/or the status 112 of each of the respective one or more user device(s). As described above, this can include ranking (e.g., by the broker device(s) 102) the one or more user device(s) for potential use as the audio device 302 based, at least in part, on the one or more capabilities 110 and/or the status 112 of each of the respective one or more user devices. For example, the broker device(s) 102 can create a hierarchy 200 of user device(s) for potential use as the audio device 302, as shown in FIG. 2.

At (608), the method 600 can include identifying one or more user device(s) for potential use as a display device. For instance, the broker device(s) 102 can identify one or more user device(s) (e.g., 106B-D) of at least the subset of user devices for potential use as the display device 304 based, at least in part, on the one or more capabilities 110 and/or the status 112 of each of the respective one or more user device(s). As described herein, this can include ranking, by the one or more broker device(s) 102, the one or more user device(s) for potential use as the display device 304 based, at least in part, on the one or more capabilities 110 and the status 112 of each of the respective one or more user device(s). For example, the broker device(s) 102 can create a hierarchy 200 of user device(s) for potential use as the display device 304 based, at least in part, on the capabilities 110 and/or the status 112 of each of the respective user device(s). In some implementations, the broker device(s) 102 can identify one or more of the broker device(s) itself for potential use as the audio device 302 and/or display device 304, as described above.

At (610), the method 600 can include selecting an audio device and a display device. The broker device(s) 102 can select one or more user device(s) for use as the audio device 302 and/or the display device 304 based, at least in part, on the parameters 108, the one or more hierarchies 200, etc. For instance, the broker device(s) 102 can select a first user device 106A of the plurality of user devices 100 for use as the audio device 302 and a second user device 106B of the plurality of user devices 100 for use as the display device 304. In some implementations, the broker device(s) 102 can be different devices than the audio device 302 and/or the display device 304. In some implementations, the broker device(s) 102 can also serve as the audio device 302 and/or the display device 304. As indicated above, at least one of the one or more broker device(s) 102 (e.g., computing devices), the audio device 302, and/or the display device 304 can be a wearable device.

Additionally, and/or alternatively, at least one of the broker device(s) 102 (e.g., computing devices), the audio device 302, and/or the display device 304 can be a non-wearable device. By way of example, the plurality of user device(s) can include an integrated device (e.g., Google Chromecast®), a speaker system, and a television within a user's home. The integrated device can function as the broker device(s) 102, which can detect the other devices in the device ecosystem of the user's home. The integrated device can select the speaker system for use as the audio device 302 and the television for use as the display device 304.

At (612) and (614), the method 600 can include receiving a message and identifying audio content and visual media content of the message. For instance, the broker device(s) 102 can receive a message 306 that includes audio content 310 and visual media content 312. In some implementations, the broker device(s) 102 can perform one or more of steps (602)-(610) before, during, and/or after receiving the message 306. The broker device(s) 102 can identify the audio content 310 and the visual media content 312 included in the message 306, as described herein. The broker device(s) 102 can send a first set of data 314 descriptive of the audio content 310 to an audio device 302, at (616), and can send a second set of data 316 descriptive of the visual media content 312 to a display device 304, at (618). The audio device 302 can be configured to communicate the audio content 310 to a user 402 of the audio device 302 and the display device 304 can be configured to display the visual media content 312 for the user 402. In some implementations, the display device 304 can be configured to display the visual media content 312 while the audio device 302 communicates the audio content 310 to the user.

By way of example, the integrated device (e.g., Google Chromecast®), functioning as the broker device(s) 102, can receive a message 306 such as an educational seminar podcast. The integrated device can identify the audio content 310 (e.g., lecture portion) of the podcast as well as any visual media content 312 (e.g., a presentation with diagrams, charts, info-graphics) that is to be presented to the user 402 while listening to the podcast. The integrated device can send data descriptive of the lecture to the audio device 302 (e.g., the speaker system) and data descriptive of the presentation to the display device 304 (e.g., the television). The speaker system can be configured to play the lecture (e.g., audio content) for the user 402 and the television can be configured to display the corresponding visual media content 312 (e.g., a presentation with diagrams, charts, infographics) for the user 402.

At (620), the method 600 can include notifying a user of viewable visual media content. For instance, the broker device(s) 102 can provide a notification to a user of the audio device 302 to view the visual media content 312 on the display device 304. In some implementations, to do so, the broker device(s) 102 can send data 320 descriptive of the notification 404 to the audio device 302, the audio device 302 (e.g., the speaker system) being configured to communicate the notification 404 (e.g. a phrase "look at TV") to the user of the audio device 304. The notification can be provided to the user of the audio device 302 at a first time 408, and the display device 304 can be configured to display the visual media content 312 for the user at the first time 408. For example, the speaker system can communicate to the user to look at the television when a diagram that is being discussed in the lecture is displayed on the television. As described herein, in some implementations, the notification can be communicated to the user of the audio device 302, and the display device 304 can be configured to display the visual media content 312 for the user based, at least in part, on an intent-to-view action (e.g., a glance gesture) by the user.

In some implementations, at (622), the method 600 can include determining a change in user device status and selecting one or more different user device(s) as the audio device and/or the display device, at (624). For instance, the broker device(s) 102 can determine a change in the status 112 associated with at least one user device of the plurality of user devices 100. In some implementations, the broker device(s) 102 can select a different user device than the first user device 106A as the audio device 302 based, at least in part, on the change in the status 112. For example, in the event that the integrated device detects that the user has begun to use a tablet, the integrated device (functioning as the broker device(s) 102) can select the tablet to communicate the lecture to the user (instead of the speaker system). In some implementations, the broker device(s) 102 can select a different user device than the second user device 106B as the display device 304 based, at least in part, on the change in the status 112 (e.g., as shown in FIG. 5).

Figure 7:
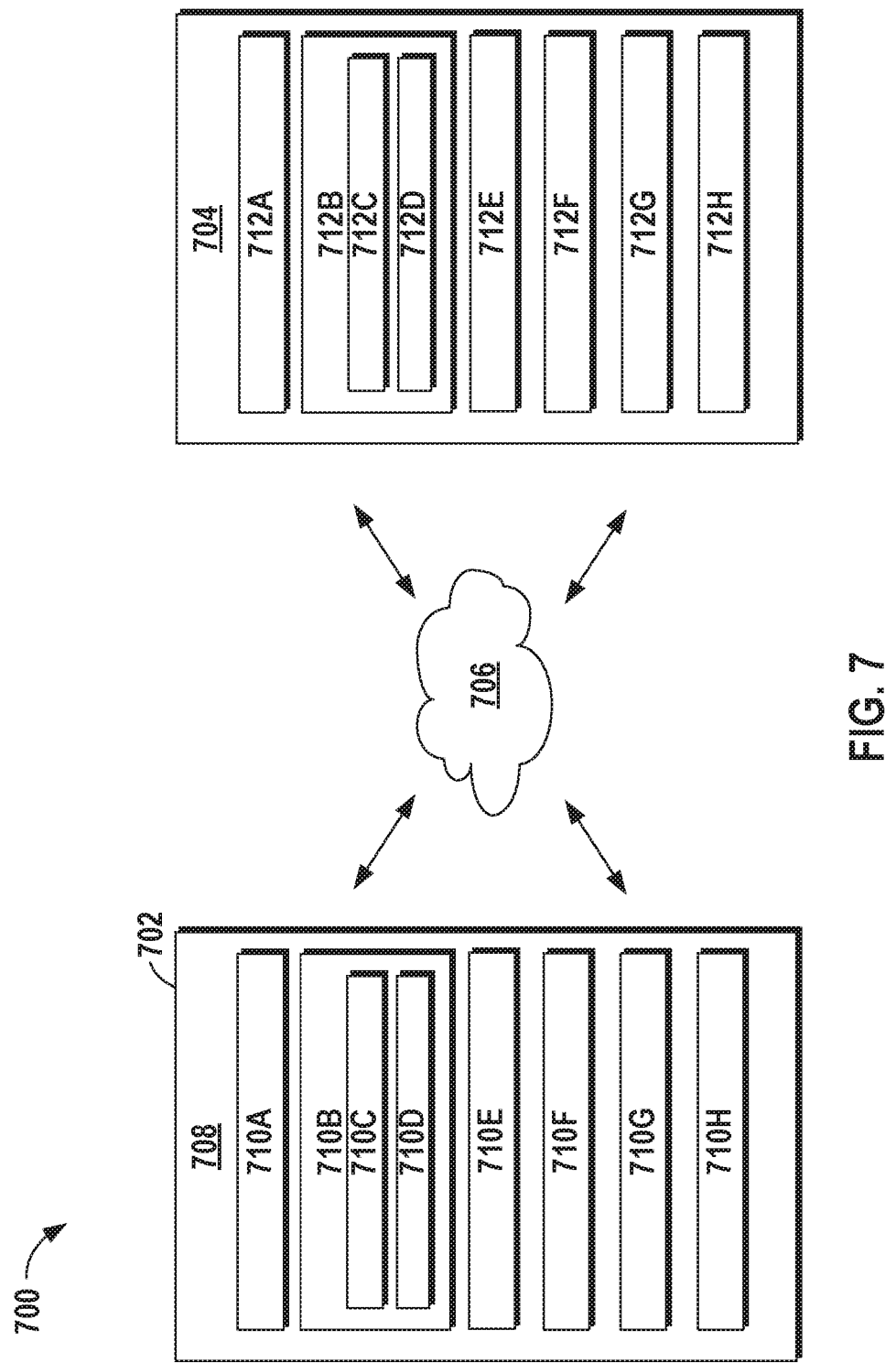
FIG. 7 depicts an example system according to example embodiments of the present disclosure.

FIG. 7 depicts an example system 700 according to example embodiments of the present disclosure. The system 700 can include one or more broker device(s) 702 and one or more user device(s) 704. The broker device(s) 702 can correspond to the broker device(s) (e.g., 102), as described herein. The user device(s) 704 can correspond to the user device(s) (e.g., 106A-D, 118), as described herein. The broker device(s) 702 and the user device(s) 704 can be included in a plurality of user devices (e.g., 100), such as an ecosystem of wearable and/or non-wearable user devices. Moreover, the broker device(s) 702 and the user device(s) 704 can communicate with each other via one or more network(s) 706.

The broker device(s) 702 can include one or more computing device(s) 708. The one or more computing device(s) 708 can include one or more processor(s) 710A and one or more memory device(s) 710B. The processor(s) 710A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) dedicated to efficiently rendering images or performing other specialized calculations. The memory device(s) 710B can include one or more computer-readable media, including, but not limited to, non-transitory computer-readable media, RAM, ROM, hard drives, flash memory, or other memory devices.

The memory device(s) 710B can store information accessible by the processor(s) 710A, including instructions 710C that can be executed by the processor(s) 710A. The instructions 710C can be software written in any suitable programming language or can be implemented in hardware. Additionally, and/or alternatively, the instructions 710C can be executed in logically and/or virtually separate threads on processor(s) 710A.

The instructions 710C can be executed by the processor(s) 710A to cause the processor(s) 710A (and/or the computing system 700) to perform operations. For example, the broker device(s) 702 of the system 700 can include one or more tangible, non-transitory computer-readable media storing computer-readable instructions that when executed by one or more processor(s) 710A cause the one or more processor(s) 710A (and/or the computing system) to perform operations. The operations can include any of the operations and functions for which the broker device(s) 102 are configured, as described herein, any of the operations and functions of the broker device(s) 102, operations and functions for managing message content (e.g., method 600), and/or any other operations or functions of the broker device(s) 102. By way of example, the operations can include detecting a plurality of user devices within a communication range, determining one or more capabilities and a status of each user device in at least a subset of the plurality of user devices, selecting at least one user device of the subset of user devices as an audio device and at least one user device of the subset of user devices as a display device based at least in part on the one or more capabilities and the status of the respective user devices, receiving a message including audio content and visual media content, sending a first set of data descriptive of the audio content to the audio device, sending a second set of data descriptive of the visual media content to a display device, and/or providing a notification to a user of the audio device to view the visual media content on the display device, as described herein.

The instructions 710C can also be executed by the processor(s) 710A to identify types of message content. In some implementations, the instructions 710C can also be executed by the processor(s) 710A to convert audio content of a message to a format that can be communicated to a user of the audio device. For example, the instructions 710C can be executed by the processors to cause processor(s) 710C to parse data indicative of textual content and convert such data into a format that can be audibly produced for a user.

The one or more memory devices 710B can also include data 710D that can be retrieved, manipulated, created, or stored by the one or more processor(s) 710A. The data 710D can include, for instance, a message 306, data 314, 316 descriptive of audio content 310 and/or visual media content 312, data associated with parameters 108, data associated with one or more hierarchies 200, data associated with another component of the system 700, data associated a notification (e.g., 404, 406) and/or any other data/information described herein.

In some implementations, the computing device(s) 708 can include an audio output component 710E and/or a display output component 710F. The audio output component 710E can include hardware for audibly producing audio content for a user. For example, the audio output component 710E can include one or more speaker(s), earpiece(s), headset(s), handset(s), etc. The display output device 710F can include hardware for displaying visual media content for a user. For example, the display output device 710F can include a display screen, CRT, LCD, plasma screen, touch screen, TV, projector, etc. In some implementations, the computing device(s) 708 can include one or more sensor(s) 710G. The sensor(s) 710G can include a motion sensor, location sensor, heat sensor, accelerometer, gyroscope, and/or other types of sensors. The sensor(s) 710G can be configured, for example, to detect an intent-to-view action (e.g., glance gesture) by a user.

The computing device(s) 708 can also include a communication interface 710H used to communicate with one or more other component(s) of the system 700 (e.g., the user device(s) 704) to send and/or receive data. The communication interface 710H can include any suitable components for interfacing with one or more network(s), including for example, transmitters, receivers, ports, controllers, antennas, or other suitable components.

The user device(s) 704 can include one or more processor(s) 712A and one or more memory device(s) 712B. The processor(s) 712A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) dedicated to efficiently rendering images or performing other specialized calculations. The memory device(s) 712B can include one or more computer-readable media, including, but not limited to, non-transitory computer-readable media, RAM, ROM, hard drives, flash memory, or other memory devices.

The memory device(s) 712B can store information accessible by the processor(s) 712A, including instructions 712C that can be executed by the processor(s) 710A. The instructions 712C can be software written in any suitable programming language or can be implemented in hardware. Additionally, and/or alternatively, the instructions 712C can be executed in logically and/or virtually separate threads on processor(s) 712A. The instructions 710C can be executed by the processor(s) 710A to cause the processor(s) 710A (and/or the user device(s) 704) to perform operations. For example, the user device(s) 704 of the system 700 can include one or more tangible, non-transitory computer-readable media storing computer-readable instructions that when executed by one or more processor(s) 712A cause the one or more processor(s) 712A to perform operations. The operations can include any of the operations and functions for which the user device(s) 106A-D, 118 are configured, as described herein, any of the operations and functions of the user device(s) 106A-D, 118, operations and functions for receiving and communicating message content and/or notifications, and/or any other operations or functions of the user device(s).

The one or more memory devices 712B can also include data 712D that can be retrieved, manipulated, created, or stored by the one or more processor(s) 712A. The data 712D can include, for instance, data 314, 316 descriptive of audio content 310 and/or visual media content 312, data associated with parameters 108, data associated with one or more hierarchies 200, data associated with a user, data associated with another component of the system 700, data 320 associated a notification (e.g., 404, 406) and/or any other data/information described herein.

In some implementations, the user device(s) 704 can include an audio output component 712E and/or a display output component 712F. The audio output component 712E can include hardware for audibly producing audio content for a user. For example, the audio output component 712E can include one or more speaker(s), earpiece(s), headset(s), handset(s), etc. The display output device 712F can include hardware for displaying visual media content for a user. For example, the display output device 712F can include a display screen, CRT, LCD, plasma screen, touch screen, TV, projector, etc. In some implementations, the user device(s) 704 can include one or more sensor(s) 712G. The sensor(s) 712G can include a motion sensor, location sensor, heat sensor, accelerometer, gyroscope, and/or other types of sensors. The sensor(s) 712G can be configured, for example, to detect an intent-to-view action (e.g., glance gesture) by the user.

The user device(s) 704 can also include a communication interface 712H used to communicate with one or more other component(s) of the system 700 (e.g., the broker device(s) 702) to provide and/or receive data. The communication interface 712H can include any suitable components for interfacing with one or more network(s), including for example, transmitters, receivers, ports, controllers, antennas, or other suitable components.

The network 706 can be any type of communications network, such as a local area network (e.g. intranet), wide area network (e.g. Internet), cellular network, or some combination thereof. The network 706 can include a direct (wired and/or wireless) connection between the broker device(s) 702 and the user device(s) 704. In general, communication between the broker device(s) 702 and the user device(s) 704 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device (e.g., broker device) can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A computing device configured to serve as a broker for managing delivery of audio and visual content through different devices, the computing device comprising:
   a display;
   an interface for wireless communication with an audio device; and
   one or more processors in communication with the display and the interface, the one or more processors configured to:
   parse message content into audio data and visual data, wherein the audio data is different from the visual data;
   select an audio device for delivery of the audio data to a user, wherein the audio device is wirelessly coupled to the computing device; and
   coordinate delivery of the audio data through the audio device with delivery of the visual data through the display, wherein coordinating delivery of the audio data with delivery of the visual data comprises synchronizing a timing of the delivery of the audio data and the visual data to the user.

2. The computing device of claim 1, wherein parsing the message comprises identifying text and converting it to audio.

3. The computing device of claim 1, wherein the message is received from another device.

4. The computing device of claim 1, wherein the computing device is a wearable device.

5. The computing device of claim 1, wherein the audio device is a wearable device.

6. The computing device of claim 1, wherein selecting the audio device comprises determining a priority device from among a plurality of devices.

7. The computing device of claim 6, wherein priority is based on operating states of the plurality of devices.

8. The computing device of claim 1, wherein coordinating delivery of the audio data with delivery of the visual data comprises providing a notification through the audio device that visual data is available on the display.

9. The computing device of claim 1, wherein the computing device comprises a device for streaming media.

10. A method for managing, by a broker device, delivery of audio and visual content through different devices, the method comprising:
    parsing, by one or more processors message content into audio data and visual data, wherein the audio data is different from the visual data;
    selecting, by the one or more processors, an audio device for delivery of the audio data to a user, wherein the audio device is wirelessly coupled to the broker device through a communication interface of the broker device; and
    coordinating, by the one or more processors, delivery of the audio data through the selected audio device with delivery of the visual data through a display of the broker device, wherein coordinating delivery of the audio data with delivery of the visual data comprises synchronizing a timing of the delivery of the audio data and the visual data to the user.

11. The method of claim 10, wherein parsing the message comprises identifying text and converting it to audio.

12. The method of claim 10, wherein the message is received from another device.

13. The method of claim 10, wherein the broker device is a wearable device.

14. The method of claim 10, wherein the audio device is a wearable device.

15. The method of claim 10, wherein selecting the audio device comprises determining a priority device from among a plurality of devices.

16. The method of claim 15, wherein priority is based on operating states of the plurality of devices.

17. The method of claim 10, wherein coordinating delivery of the audio data with delivery of the visual data comprises providing a notification through the audio device that visual data is available on the display.

18. The method of claim 10, wherein the broker device comprises a device for streaming media.

* * * * *